US007383583B2

(12) United States Patent
Marr et al.

(10) Patent No.: US 7,383,583 B2
(45) Date of Patent: Jun. 3, 2008

(54) STATIC AND RUN-TIME ANTI-DISASSEMBLY AND ANTI-DEBUGGING

(75) Inventors: Michael David Marr, Sammamish, WA (US); Brandon Baker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 789 days.

(21) Appl. No.: 10/795,058

(22) Filed: Mar. 5, 2004

(65) Prior Publication Data

US 2005/0198526 A1 Sep. 8, 2005

(51) Int. Cl.
*H04L 9/00* (2006.01)
*G06F 9/44* (2006.01)

(52) U.S. Cl. .................................. 726/26; 717/106
(58) Field of Classification Search .............. 726/26
See application file for complete search history.

(56) References Cited

U.S. PATENT DOCUMENTS

| 5,764,374 | A | * | 6/1998 | Seroussi et al. ............ 382/244 |
| 6,006,328 | A | * | 12/1999 | Drake ........................ 726/23 |
| 6,480,959 | B1 | * | 11/2002 | Granger et al. ............. 713/189 |
| 6,594,761 | B1 | * | 7/2003 | Chow et al. ................ 713/190 |
| 6,668,325 | B1 | * | 12/2003 | Collberg et al. ............ 713/194 |
| 6,829,710 | B1 | * | 12/2004 | Venkatesan et al. ......... 713/176 |
| 6,981,146 | B1 | * | 12/2005 | Sheymov ................... 713/172 |
| 2002/0016918 | A1 | * | 2/2002 | Tucker et al. ............... 713/190 |
| 2005/0183072 | A1 | * | 8/2005 | Horning et al. ............. 717/140 |
| 2006/0053307 | A1 | * | 3/2006 | Xu et al. .................... 713/190 |

OTHER PUBLICATIONS

Aucsmith, D., "Tamper Resistant Software: An Implementation", *Proceedings 1st International Information Hiding Workshop (IHW)*, Cambridge, U.K. 1996, *Springer LNCS 1174*, 1997, 317-333.
Collberg, C. et al., "A Taxonomy of Obfuscating Transfromations", *Technical Report No. 148, Department of Computer Science, University of Auckland*, New Zealand, Jul. 1997, 36 pages.
Horne, B. et al., "Dynamic Self-Checking Techniques for Improved Tamper Resistance", *Proceedings 1st ACM Workshop on Digital Rights Management(DRM2001)*, Springer LNCS 2320, 2002, 141-159.
Linn, C. et al., "Enhancing Software Tamper-Resistance via Stealthy Address Computations", *Work in Progress, 19th Annual Computer Society Applications Conference(ACSAC2003)*, Dec. 2003, 1-3.
Wang, C. et al., "Software Tamper Resistance: Obstructing Static Analysis of Programs", *Technical Report CS-2000-12, Department of Computer Science, University of Virginia*, Dec. 2000, 18 pages.

* cited by examiner

*Primary Examiner*—Matthew Heneghan
(74) *Attorney, Agent, or Firm*—Woodcock Washburn LLP (57) ABSTRACT

In order to prevent analysis by static and dynamic disassembly techniques, instruction level code obfuscation is performed to induce misalignment and mistaken analysis by disassemblers. Misalignment is induced by including a bypass which leads, during execution, to a legitimate location. During analysis, however, bogus data may be analyzed by the disassembler due to the bypass. Run-time modifications may also be included in code. Code is changed to an invalid state, and instructions inserted into the code which will return the code to a valid state during execution. During analysis, these invalid states may be analyzed by the disassembler as invalid instructions. Induced misalignments and run-time modifications can be chained together to produce sequences of code that will always produce invalid disassembly output from common disassemblers.

22 Claims, 3 Drawing Sheets

STATIC AND RUN-TIME ANTI-DISASSEMBLY AND ANTI-DEBUGGING

FIELD OF THE INVENTION

The present invention relates generally to the field of computing, and, more particularly, to preventing examination or manipulation of code by implementing instruction-level obfuscation techniques.

BACKGROUND OF THE INVENTION

Generally, computer applications run by executing object code. The object code controls the actions of the computer systems on which it is run. Such code may be made public or otherwise made accessible by its authors, for example by publishing the original source code that was compiled to create the object code. When software is sold publicly, the object code will be accessible for analysis by others. The original authors may also choose to make the object code more accessible by other programmers by including "debug symbols" which are data files which help to describe the structure of the object code so that users of the object code can debug their own programs. However, for some uses, it is advisable to protect code, including object code, from examination by possible adversaries. For example, where the code represents the best available implementation of a particular algorithm, the code itself may represent a trade secret. In another example, where code is used to secure content, it may be useful to protect the code in order to ensure the security of the content from an adversary.

Maintaining the security of content may be useful in many contexts. One such context is where the content is private information, for example, financial information about a computer user, user passwords, or other personal information. Another context in which maintaining the security of content is useful is when the secure content is content which is to be used only in a limited way. For example, copyrighted content may be protected by requiring a license for use.

License provisions may be enforced for secure content by a digital rights management (DRM) application. In some DRM applications, content is stored only in an encrypted form, and then decrypted for use according to an electronic license which defines the specific user's rights to use the content. Some or all of the code and associated decryption data which decrypts the encrypted content is therefore protected, because if this code which accesses the copyrighted context is compromised, it may be possible to access the copyright outside of the bounds of the electronic license, for unlicensed uses.

Code which protects sensitive information or performs other sensitive operations is, in some contexts, referred to as a "black box." The black box may include hardware elements along with software elements. When a black box (or other sensitive code) is being used on a computer system, an adversary may use several means in order to attempt to compromise the security of the operations of the black box. For example, an adversary may attempt to trace the code running in the black box. One way in which an adversary may attempt to do this is by using a debugger to track the progress of the code. Another way an adversary may attempt to compromise the security of the black box is by making modifications to the code in order to provide access to the secure content to the adversary.

There are numerous tools for discouraging static analysis of binary images of code. Static analysis is analysis of the code when it is not executing. For example, certain of these tools for discouraging static analysis allow sections of binaries to be rendered unreadable at or after compile time. For example, some tools encrypt sections of the binary. Thus, before run-time, the binary is unreadable. When the code is to be run, the code is returned to its original state, e.g. by decryption where the modification was encryption. Therefore, an adversary will not be able to perform a static analysis on the binary, but the code will function properly when it is decrypted for execution.

Increasingly, however, dynamic analysis tools and dynamic analyzers integrated with debuggers are being created and used. Such tools allow an adversary to examine code as it is executing. Because the code, as it is executing, has been returned to its unmodified state (e.g. by decryption) it can be analyzed by an adversary using techniques that exist for static analysis. Therefore, static analysis prevention tools such as encryption of binaries are not effective protection for sensitive code, which must be protected from both static and dynamic disassembly techniques.

In view of the foregoing, there is a need for a system that overcomes the drawbacks of the prior art.

SUMMARY OF THE INVENTION

The present invention prevents analysis by static and dynamic disassembly techniques by performing instruction-level code obfuscation. Thus, the sensitive code is modified by obfuscation of portions of the code at the instruction level. These code obfuscations are corrected shortly before the execution point of the code.

The code obfuscations include bogus data injection into the instruction stream and run-time modifications which occur just before the execution point of the modified instructions.

Data injection into the instruction stream can fool both static and run-time disassemblers into treating bogus data and parts of other instructions as instruction opcodes. This misinterpretation of the instruction data can be referred to as "instruction misalignment" because the disassembler can no longer effectively determine instruction boundaries. This causes a cascade of misinterpretation by the disassembler which lasts as long as the disassembler remains misaligned. Such data injection, in one embodiment, includes a bypass and bogus data which triggers misalignment of a disassembler.

Run-time modification code snippets inserted into code change an instruction before it is executed. This is achieved, e.g., by performing an arithmetic operation on the bytes of the instruction, writing bytes over parts of the instruction, or copying bytes from a location in memory over the instructions. The modification makes the instruction valid. In one embodiment, after execution, the code is modified again to return it to an invalid state.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

Debuggers and static and dynamic disassemblers analyze code and allow a user to examine its contents. In order to protect sensitive code from such disassembly and debugging by an adversary, code obfuscation is performed. The present invention provides mechanisms for inserting bogus data and runtime modifications into sensitive code. Such obfuscation hinders or prevents examination of the contents of code by such static and dynamic disassemblers.

The description of code misalignments and run-time modifications presented herein relate primarily to assembly language code. However, the techniques described may be applicable to code in other programming languages, and it is contemplated that the application of the mechanisms described and claimed is not limited to assembly language code. That is, any system that infers non-executable source code from executable object code and related data files (for example, debugging symbol files) might be affected by the invention herein.

Exemplary Computing Arrangement

Figure 1:
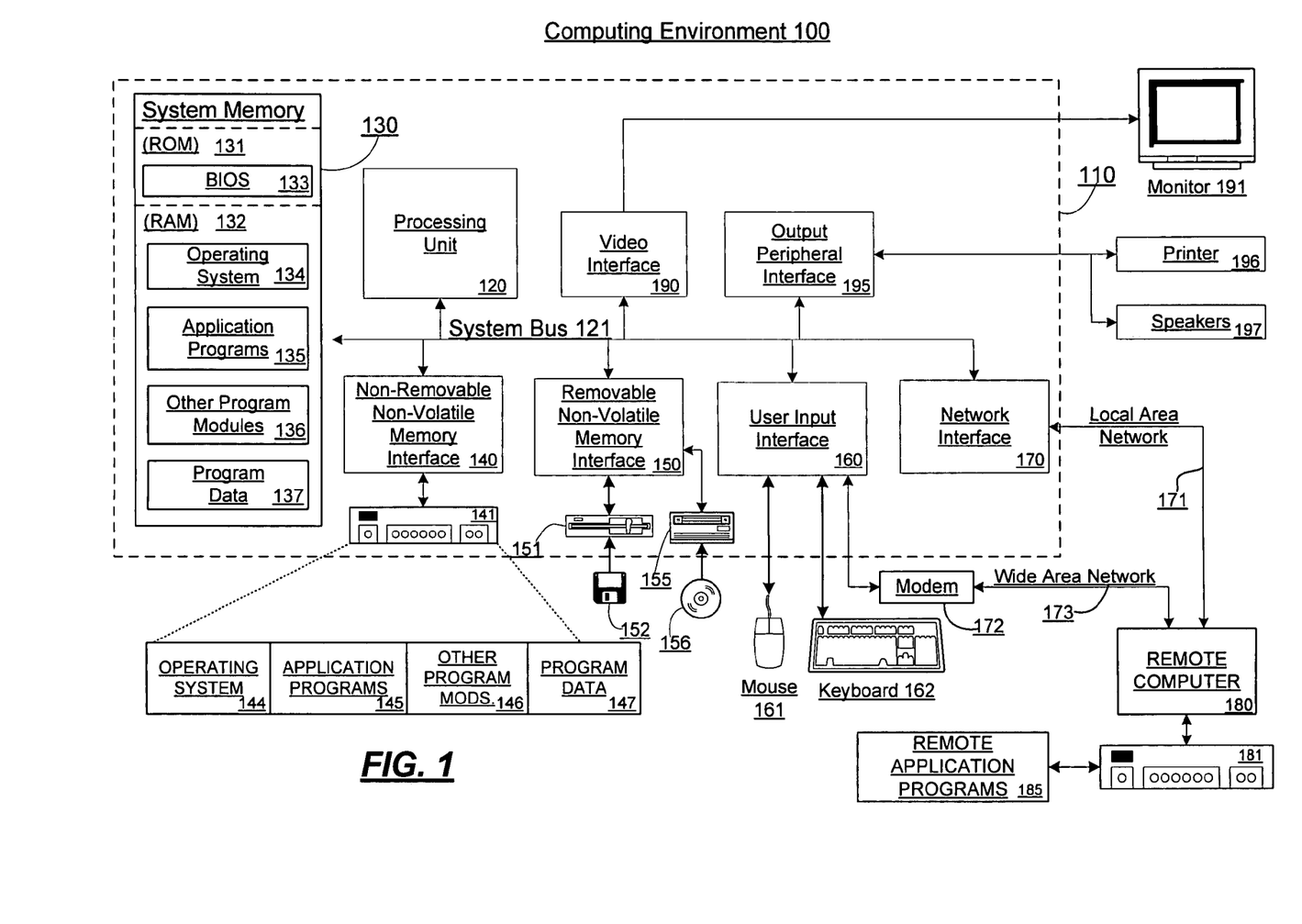
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Inducing Misalignments

Figure 2:
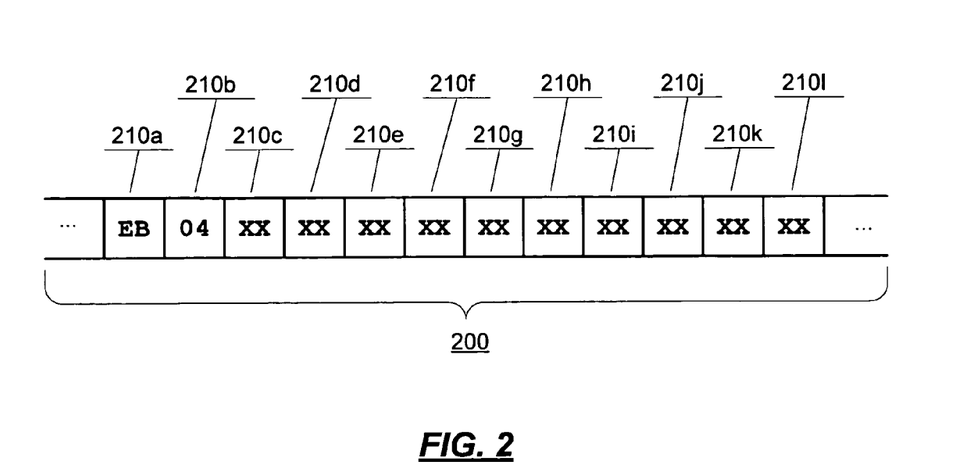
FIG. 2 is a block diagram of an instruction stream in which aspects of the invention may be implemented.

On computer platforms with variable length instructions, such as X86 platforms, in order to allow a user to examine code, a disassembler must determine which bytes of the code are part of which instructions. Thus, the disassembler must rely on sequentially decoding instruction streams from a known valid starting location, like the address of a module "entry point" described in an export table of the portable executable (PE) header. An instruction stream is a stream of bytes which is loaded into memory by the operating system and decoded and executed by the processing unit. FIG. 2 is a representation of an instruction stream 200 containing bytes 210.

Where variable length instructions are possible, given a stream of bytes in an object code instruction stream 200 without an indication of an initial byte for an instruction, it can not be determined how many bytes or which bytes are used in one instruction in the object code until the execution begins on the code and determine an end byte for the previous instruction. An instruction may consist of an initial number of bytes which describe the type of instruction (an opcode), followed optionally by bytes which are arguments to the instruction (an operand). While byte 210a may be the opcode for an instruction with byte 210b as its operand, if the previous instruction ends with byte 210a, then byte 210b may be the opcode of an instruction, and that instruction may continue in succeeding bytes in the instruction stream 200. A program counter is used to control the flow of execution through the instruction stream 200. The program counter is a register which stores the address of the next instruction to be executed.

One possible instruction in most versions of assembly language is a jump relative instruction. A jump relative instruction jumps a specified number of bytes forward in the instruction stream. The jump relative instruction adds the number of bytes specified by its operand to the program counter which causes execution to jump ahead by the specified number of bytes.

Thus, if the byte value "EB" is the opcode for the jump relative command, the two bytes "EB 04" stored in bytes 210a and 210b will perform a relative jump over the next four bytes. The program counter will then point to byte 210g, where execution will continue. Other jumps are also possible, including jumps to a specific location in the instruction stream ("absolute" jump), jumps which are conditional, etc. Jumps and other instructions which will cause execution to transition to another location in the instruction stream can be used to create a misalignment which will foil disassembly analysis.

As an example of how such misalignments may be caused, a misalignment will be described which prevents a disassembler from determining that the instruction stream contains the instruction:

FF 15 28 10 00 01 which in certain execution environments represents:

call dword ptr [_imp_GetProcessHeap@0 (1001028)]

In order to create the misalignment, a portion of another instruction will be used. This instruction is a seven-byte instruction:

89 84 8A 00 16 00 00 which represents mov dword ptr [edx+ecx*4+1600h], eax

Figure 3:
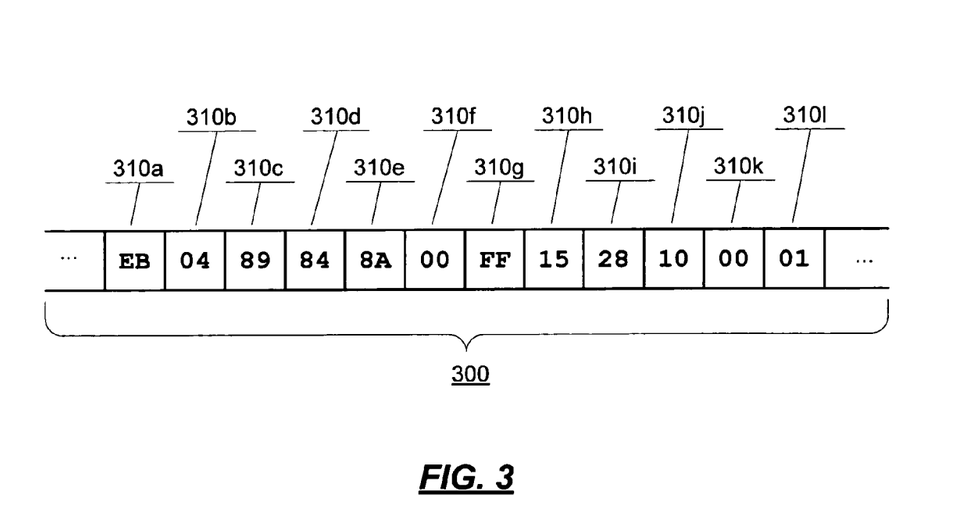
FIG. 3 is a block diagram of an instruction stream according to an example illustrating one embodiment of the invention.

FIG. 3 is a representation of an instruction stream 300 containing bytes 310, certain of which have been injected to induce a misalignment around the first instruction (call dword ptr . . . ) discussed above using the fact that the second instruction (mov dword ptr . . . ) discussed above is a seven-byte instruction. The first instruction is represented in bytes 310g through 310l. In order to cause a misalignment, however, only a fragment of the second instruction has been added.

The result of adding these bytes is a misalignment which will confuse a disassembler. Disassemblers operate under the assumption that the instruction stream 300 contains a sequence of complete instructions. When a disassembler reaches the instruction in bytes 310a and 310b, it will decode the "jmp 04" instruction represented by the "EB 04" object code. However, the disassembler will continue interpreting bytes continuing with byte 310c, in order provide a complete picture of all instructions in the instruction stream 300. Thus, it would attempt to interpret bytes starting with 310c into an instruction.

As a result, instead of interpreting the code in instruction stream 300 as follows:

| | |
|---|---|
| EB 04 | ; jump to Calladdr |
| 89 84 8A 00 | ; incomplete instruction |
| Calladdr: | |
| FF 15 28 10 00 01 | ; call instruction | a disassembler will interpret the code as follows:

| | |
|---|---|
| EB 04 | ; jump to Calladdr |
| 89 84 8A 00 FF 15 28 | ; bogus mov instruction |
| 10 00 01 | ; bogus add ??? instruction |

Generally, in order to perform a misalignment, (1) bogus incomplete instruction data is inserted into the code, and (2) a bypass is inserted which allows correct execution to bypass the bogus incomplete or invalid instruction data.

The bypass may, as described, be a bypass which will be taken during execution, followed sequentially with bogus code. Some disassemblers will always assume that a conditional jump is not taken, these disassemblers will be misaligned by conditional jumps contained in such bypasses.

However, some disassemblers will always assume that a conditional jump is taken. Thus, some bypasses allow execution to bypass the bogus code by creating a situation in which the jump or other bypass leads to the bogus code. During execution, the bypass will not be taken. However, a disassembler will take the bypass, which will lead the disassembler to the bogus data.

To fool both kinds of disassemblers, both styles of bypass code, that is which assume conditional jumps taken vs. not taken, can be included sequentially in the instruction stream with appropriate bogus data. This will guarantee that a misalignment occurs at that site in the instruction stream no matter which type of disassembler is analyzing the code.

Bogus Data

In one embodiment, bogus instruction data consists of random bytes. Upon examination of these random bytes, the disassembler will attempt to interpret the bogus instruction data, which will likely cause a misalignment. Additionally, random bytes may yield a random instruction, which will confuse the user of the disassembler.

According to another embodiment, bogus instruction data is chosen to be instruction opcodes whose instructions are long but are not specified completely. Since such instruction opcodes signal instructions that are not completely specified, real instructions that follow are interpreted as being part of the bogus instruction—and misalignment occurs. For example, the first four bytes of the instruction "89 84 8A 00 16 00 00" is inserted into the instruction stream; that is, the seven byte instruction is inserted with the final three bytes omitted. Three bytes from the following real executable instruction "FF 15 28 10 00 01" are interpreted as the omitted three bytes. The resulting instruction appears to be "89 84 8A 00 FF 15 28" which will be interpreted as "mov dword ptr [edx+ecx*4+2815FF00h], eax". Since the last three bytes of the instruction "89 84 8A 00 16 00 00" are not specified, the first three bytes of the instruction "FF 15 28 10 00 01" became part of the value "2815FF00h" which is added in the instruction. Because of this, bytes of the real instruction will be interpreted as part of an "argument" to the bogus data's partial instruction.

Bypasses

Bypasses may be accomplished by any means which causes the processor to transition execution to a new location. Direct bypasses can be accomplished with jump instructions, as described above. More indirect transitions include a combination of instructions. For example, in the X86 instruction set, the following possible indirect transitions are possible bypasses:

"push" a return address on the stack and "ret"—this will cause the processor to return to the pushed address. Such a push and return combination may also include an instruction which, before returning, modifies the pushed address (e.g. using "add", "mov", etc.);

Perform a "call" to a nearby address (e.g. to the next instruction). This implicitly causes a return address to get pushed on to the stack. After the "call", modify the return address. The return from the call will therefore be to a different location than the expected return;

Cause a conditional flag to get set by the processor (for example, using cmp, test, stc, or clc) and then perform a conditional branch with the intention of always or never branching.

Use of a combination of bypass transitions reduces the chances that the disassembler will properly interpret all of the bypasses, and thus increases the chances that the disassembler will encounter the bogus instruction data and become misaligned.

Random Insertion of Misalignments

In one embodiment, misalignments (bypasses and bogus data) are generated automatically. Elements of the misalignments may be chosen so that a variety of bypasses and bogus data is used. Such a variety will insure that an adversary who has figured out one of the misalignments or a disassembler which is not susceptible to that misalignment may still not be able to correctly identify or interpret another misalignment. The following may be randomly selected for each insertion of a misalignment:

Instruction fragment The instruction fragment used for the bogus data may be selected from among a pool of possible instruction fragments. Such a pool may consist of a number of instruction fragments which are not completely specified. In the case where some bogus data may be random, such random bogus data may be randomly generated for each instruction fragment, or for some proportion of the instruction fragments required (with others, for example, selected from a pool as described above.)

Fragment length The length of the bogus data may also be random. In the case where instruction fragments are selected from a predetermined pool, additional bytes or fragments may be added randomly to increase the length. In the case where random data is used for the bogus data, different fragment lengths may be used for the bogus data.

Transition method and instructions used for the transition method As described above, there are different methods for performing bypasses—the bypass to be used may be randomly selected from among these. Additionally, the method used to implement the selected transition method may be selected from among the possibilities. For example, the method may be one from among the several ways to set conditional codes for conditional bypass, or one jump from among several ways to perform a direct jump.

Registers and addressing modes used by each instruction Different registers may be used by bypass instructions, and to the extent that the register used is not determined by the instruction used, the register used may be selected randomly from a pool of possibilities. Additionally, the addressing mode, for example using an 8-bit vs. 32-bit relative offset in a jump, may be randomly selected to the extent that the addressing mode is not already dictated by the required bypass or instruction used in the bypass.

Bypass chain length The number of misalignments (bypass and bogus data) may also be randomly selected to create a chain of bypass/bogus data pairs. For example, a misalignment which assumes disassembly relies on a branch not taken can be followed by a misalignment which assumes disassembly relies on a branch being taken in order to cause both kinds of disassemblers to become misaligned. Generating chains which contain a random number of misalignments may be robust against future disassemblers which might be designed to be resistant to single or paired misalignments.

Some adversaries may perform entropy analysis on the statistical distribution of different registers, instructions, and addresses in the code in order to try to infer whether anti-disassembly code has been added. To preserve entropic distribution and thus hide the insertions, the distribution and selection of misalignment code may be chosen to so that the resulting code has the same entropic profile. Thus, in one embodiment, selection of misalignment code is weighted according to frequency counts of the code in which anti-disassembly segments will be inserted, and address fragments are chosen from likely and/or frequently occurring addresses of the target code.

Figure 4:
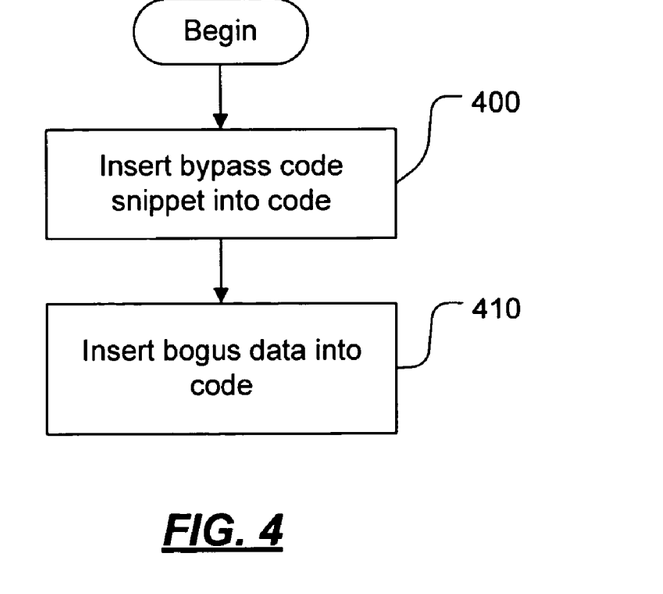
FIG. 4 is a flow diagram of a method according to one embodiment for protecting code from disassembly by inserting bogus data and associated bypass code.

FIG. 4 is a diagram of a method according to one embodiment for protecting code from disassembly by inducing misalignments in disassemblers. In step 400, a bypass code snippet is inserted into a first location in the code. The bypass code, upon execution, causes execution to transition to a second location in said code. This second location may be elsewhere in code, where bogus data is to follow the bypass code immediately. The second location may also be immediately after the bypass code, where the bypass is not taken during normal execution, but may be taken by a static disassembler which assumes, e.g., that jumps are taken, when disassembling code.

In step 410, a bogus instruction snippet is inserted into a third location in the code. The execution of the bypass code snippet will, as previously mentioned, cause a transition to the second location, not to the third location. However, a disassembler may be fooled into assuming execution will transition to the third location. The bogus data may then cause a misalignment.

Misalignments according to this method may also be used in combination with run-time instruction modifications, described below.

Run-Time Instruction Modification

Run-time instruction modifications are instructions which make modifications to bytes which make up the instruction stream. Such modifications change either the instructions which are being requested or in cases where the instruction is not completely specified, may change the data being used with the instruction. These modifications are made to other instructions involved in critical calculations of the executing program. In one embodiment, the run-time modification instructions change the instruction which directly follows in the instruction stream.

Static disassemblers generally do not track processor or memory state, and so can not infer run-time modifications to the instruction stream. Some dynamic disassemblers have integrated debuggers which allow the user to step through instruction execution and can correct misalignments once the proper execution path has been determined. However, even dynamic disassembly is really static disassembly at a particular point in time; that is, analysis can only be performed on the code when the debugger is halted and asked to reanalyze the instruction stream. Because run-time modifications of the instruction stream are rare, particularly so close in the instruction stream, disassemblers often simply ignore changes to the instruction stream as uninteresting to display to the user. That is, debuggers often don't reanalyze parts of their instruction stream, particularly that which has already been executed. Thus, even dynamic disassemblers often fail to update instructions that have been modified at run-time even when the instructions are manually single-stepped through by the user.

Although in principle, some dynamic disassemblers allow an adversary to step through the real-time instruction modifications and fix the instruction sequences, this would be unbearably time consuming to do for every instruction. Without a convenient mechanism for automatically disassembling the code, the task of inferring the instruction stream becomes a labor intensive, error prone chore for the adversary. The individualized (i.e. performed on individual instructions) and last minute (i.e. preceding the modified instruction immediately or only by only a couple instructions) nature of the run-time instruction modifications enable this technique for foiling adversaries.

In one embodiment, run-time instruction modifications consist of two parts. The first part contains one or more instructions which modify an invalid instruction into something valid. The second part contains one or more instructions which modify the valid instruction to something invalid again. The invalid instruction, in one embodiment, has a different instruction length than the valid instruction. This causes misalignments, as described above.

In another embodiment, the invalid instruction is the same length as the valid instruction, but represents a different operation. For example, an "add" may be replaced with a "subtract" or the constant "4" operand of an "add eax, 4" instruction may become "add eax, 8". The code would appear to be performing a logically different computation without necessarily misaligning subsequent disassembly of the instruction stream. This subtle misinterpretation caused by obfuscation of the instruction sequence may require the adversary to spend even more time and effort in an attempt to reverse engineer the code.

Since the processor will be executing the run-time modification instructions every time the protected code executes, whether or not a second operation which returns the valid instruction back to invalid is necessary depends on the particular method by which the instruction is made valid from its invalid state. That is, if a run-time modification snippet is used which can be executed multiple times without making the valid instruction invalid, then it is not necessary (although it may be desirable) to return the target instruction to its original invalid state. For example, unconditionally overwriting the correct bytes into the instruction stream to make the invalid instruction valid could be executed on the valid instruction without turning it invalid (i.e. it would simply overwrite the correct bytes with the same correct bytes). However, if the run-time modification involved XOR'ing the invalid instruction with a constant to make it valid, a subsequent XOR would make the instruction invalid—in this case, by returning it to its original state (such is the nature of XOR).

In order to modify an instruction at run-time, either to make it valid or to make it invalid, a number of techniques may be used. An arithmetic operation may be performed on one or more bytes of the instruction. New information may be written over one or more bytes of an instruction. Bytes may be copied from a location in memory over the instruction. These methods may be used on the instruction opcodes themselves, to change the instruction operation, registers, or addressing mode used. These methods may also be used on an instruction operand, such as a constant or target address, for example, by changing the target address specified in a jump instruction to a different target address.

As an example, the code in instruction stream 300, as previously discussed, should be interpreted as follows:

| | |
|---|---|
| EB 04 | ; jump to Calladdr |
| 89 84 8A 00 | ; incomplete instruction |
| Calladdr: | |
| FF 15 28 10 00 01 | ; call instruction |

However, if the first byte is changed to E9 rather than EB, the opcode will be interpreted as a five-byte jump relative instruction rather than a two-byte jump relative instruction. Hence, a disassembler will interpret this as:

| | |
|---|---|
| E9 04 89 84 8A | ; jmp 8A848904h |
| 00 FF 15 28 00 01 . . . | ; bogus instruction |

In this example, a code snippet would be inserted in the instruction stream which will change the E9 to an EB at some point shortly before the instruction is run, and. In some situations, a code snippet would also be inserted which would change it back to an invalid instruction afterwards. In addition to hiding the actual instruction, the effect of this is also to cause a misalignment. As an example of modifying an operand, the "04" of the "EB 04" instruction above could have started as an "09" and been changed at run-time to the valid "04" shortly before executing. This would have the effect of foiling a static disassembler that might properly interpreted the bypass jump as taken.

Code Obfuscation Using Both Misalignments and Run-Time Modifications

As alluded to in the above examples, run-time modification is particularly powerful when combined with the misalignment technique. Instructions which cause a "jump over" transition for the bypass of the misalignment can be toggled to innocuous looking instructions until right before they are executed.

Additionally, run-time modifications can also be made to fake jump-over instructions. That is, an instruction which appears to jump over other code can be changed to not jump-over or to jump a different number of bytes. This is useful against disassemblers which assume branches are taken, for example. Therefore, all combinations of misalignment and run-time modifications can be used against assumptions made by the disassembler. Certain disassemblers always assume that a jump is taken when one is encountered during disassembly and other disassemblers always assume that a jump is not taken. When techniques are combined to create a situation in which some jumps will be taken when code is executing and some jumps will not be taken, it will be difficult to determine which method applies and it will be difficult to analyze the code using existing analysis tools.

Figure 5:
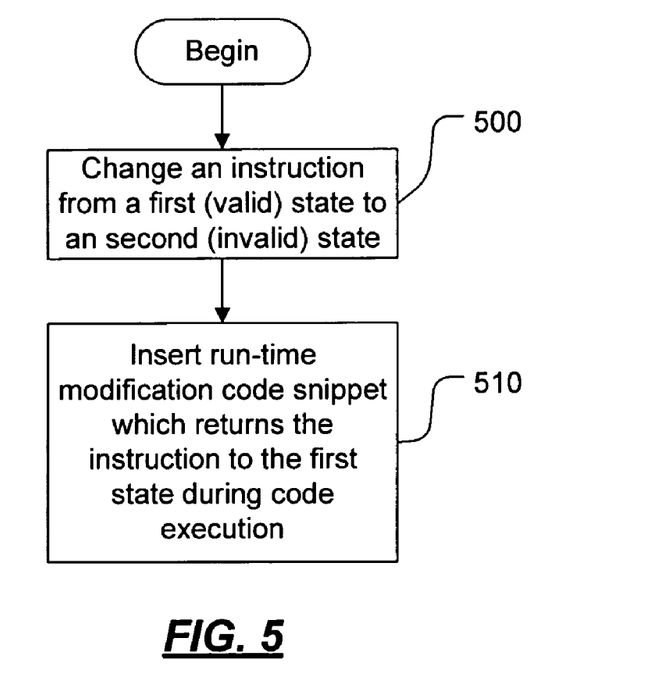
FIG. 5 is a diagram of a method according to one embodiment for protecting code from disassembly performing run-time modifications.

FIG. 5 is a diagram of a method according to one embodiment for protecting code from disassembly performing run-time modifications. In step 500, an instruction from the code is changed from a first state to a second state. This change, as described, may change the opcode or the operand of the instruction, may cause an instruction of a first length to be changed to have an opcode indicating it will be a different length, or otherwise will confuse static and dynamic disassembly.

In order for legitimate execution of the code to not be hindered, in step 510, a run-time modification code snippet is inserted into the code, so that when the code is executed, the run-time modification code snippet will modify said instruction from the second (invalid) state to the first (valid) state before execution of the instruction. In one embodiment, another run-time modification code snippet may be inserted which changes the state of the instruction back to an invalid state after execution.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for protecting code from disassembly, said method comprising:
   inserting a first bypass code snippet into a first location in said code, where said first bypass code snippet, upon execution, causes execution to transition to a second location in said code;

inserting a bogus instruction snippet into a third location in said code, such that execution of said code will, as a result of said bypass, not reach said third location, wherein the selection of the first bypass code snippet and the bogus instruction snippet preserves an entropic distribution.

2. The method of claim 1 where said first bypass code snippet causes said third location to be bypassed during execution of said code.

3. The method of claim 1, where said first bypass code snippet is followed sequentially by said second location in code, and where said third location is a location referred to by said bypass code snippet.

4. The method of claim 1, where said first bypass code snippet comprises at least one selected from among the following: a jump instruction; a return instruction, and a call instruction.

5. The method of claim 1, where said bogus instruction snippet comprises an instruction fragment comprising one or more opcode bytes describing an instruction of a certain number of bytes, and where said instruction fragment is of a length not equal to said certain number of bytes.

6. The method of claim 1, where said bogus instruction snippet comprises randomly-selected bytes.

7. A method for protecting code for disassembly, comprising at least two misalignment insertions, each of said misalignment insertions comprising the insertion of a first bypass code snippet and a bogus instruction snippet according to the method of claim 1, wherein the insertion of the first bypass code snippet and the bogus instruction snippet preserves an entropic distribution.

8. The method of claim 7, where the selection of said first bypass code snippets and said bogus instruction snippets is performed in order to include a variety among said first bypass code snippets and said bogus instruction snippets.

9. The method of claim 8, where said entropic distribution is preserved for at least one of the following: a frequency of instruction types used, frequency counts of address references, and frequency counts of register references.

10. The method of claim 1, further comprising:
modifying a first instruction of said code from a first state to a second state;
inserting a run-time modification code snippet such that when said code is executed, said run-time modification code snippet will modify said first instruction from said second state to said first state before execution of said first instruction.

11. The method of claim 1, further comprising:
inserting a second bypass code snippet into a fourth location in said code, where said second bypass code snippet, upon execution, causes execution to transition to said first location.

12. The method of claim 11, where one of said first bypass code snippet and said second bypass code snippet causes a non-sequential transition upon execution, and where the other of said first bypass code snippet and said second bypass code snippet causes a sequential transition upon execution.

13. A computer readable storage medium having a plurality of computer-executable instructions stored thereon, said instructions for performing the following:
inserting a first bypass code snippet into a first location in said code, where said first bypass code snippet, upon execution, causes execution to transition to a second location in said code;
inserting a bogus instruction snippet into a third location in said code, such that execution of said code will, as a result of said bypass, not reach said third location,
wherein the selection of the first bypass code snippet and the bogus instruction snippet preserves an entropic distribution.

14. A system for protecting code from disassembly, said system comprising:
a computing processor adapted to receive and execute computer-readable instructions;
computing memory, said computing memory having instructions stored therein for performing the following when executed by said computing processor:
inserting a first bypass code snippet into a first location in said code, said first bypass code snippet, upon execution, causing execution to transition to a second location in said code; and
inserting a bogus instruction snippet into a third location in said code, such that execution of said code will, as a result of said bypass, not reach said third location,
wherein the selection of the first bypass code snippet and the bogus instruction snippet preserves an entropic distribution.

15. The system of claim 14 where said first bypass code snippet causes said third location to be bypassed during execution of said code.

16. The system of claim 14, where said first bypass code snippet is followed sequentially by said second location in code, and where said third location is a location referred to by said bypass code snippet.

17. The system of claim 14, where said first bypass code snippet comprises at least one selected from among the following: a jump instruction; a return instruction, and a call instruction.

18. The system of claim 14, where said bogus instruction snippet comprises an instruction fragment comprising one or more opcode bytes describing an instruction of a certain number of bytes, and where said instruction fragment is of a length not equal to said certain number of bytes.

19. The system of claim 14, where said bogus instruction snippet comprises randomly-selected bytes.

20. The system of claim 14, further comprising instructions for performing the following:
modifying a first instruction of said code from a first state to a second state; and
inserting a run-time modification code snippet such that when said code is executed, said run-time modification code snippet will modify said first instruction from said second state to said first state before execution of said first instruction.

21. The system of claim 14, further comprising instructions for performing the following:
inserting a second bypass code snippet into a fourth location in said code, where said second bypass code snippet, upon execution, causes execution to transition to said first location.

22. The system of claim 21, where one of said first bypass code snippet and said second bypass code snippet causes a non-sequential transition upon execution, and where the other of said first bypass code snippet and said second bypass code snippet causes a sequential transition upon execution.

* * * * *